(12) United States Patent
Klehm et al.

(10) Patent No.: US 9,936,188 B2
(45) Date of Patent: Apr. 3, 2018

(54) PLENOPTIC IMAGING DEVICE

(71) Applicants: UNIVERSITÄT DES SAARLANDES, Saarbrücken (DE); MAX-PLANCK-GESELLSCHAFT ZUR FÖRDERUNG DER WISSENSCHAFTEN E.V., München (DE)

(72) Inventors: Oliver Klehm, Saarbrücken (DE); Ivo Ihrke, Isle-St-Georges (FR); John Restrepo, Bordeaux (FR); Alkhazur Manakov, Talence (FR); Ramon Hegedüs, Talence (FR)

(73) Assignees: UNIVERSITÄT DES SAARLANDES, Saarbrücken (DE); MAX-PLANCK-GESELLSCHAFT ZUR FÖRDERUNG DER WISSENSCHAFTEN E.V., München (DE)

( * ) Notice: Subject to any disclaimer, the term of this patent is extended or adjusted under 35 U.S.C. 154(b) by 0 days.

(21) Appl. No.: 14/765,572

(22) PCT Filed: Feb. 12, 2014

(86) PCT No.: PCT/EP2014/052747
§ 371 (c)(1),
(2) Date: Aug. 4, 2015

(87) PCT Pub. No.: WO2014/124982
PCT Pub. Date: Aug. 21, 2014

(65) Prior Publication Data
US 2016/0057407 A1    Feb. 25, 2016

(30) Foreign Application Priority Data

Feb. 13, 2013 (EP) .................................. 13155094

(51) Int. Cl.
*H04N 9/07* (2006.01)
*H04N 5/225* (2006.01)
(Continued)

(52) U.S. Cl.
CPC .......... *H04N 13/0257* (2013.01); *G02B 5/04* (2013.01); *H04N 5/2254* (2013.01);
(Continued)

(58) Field of Classification Search
CPC ...... H04N 13/0282; G06T 2207/10052; G06T 2200/21
(Continued)

(56) References Cited

U.S. PATENT DOCUMENTS 725,567 A    4/1903   Ives
3,661,439 A    5/1972   Burnside et al.
(Continued)

FOREIGN PATENT DOCUMENTS

CN    200984460 Y    12/2007
EP    2533199    12/2012
(Continued)

OTHER PUBLICATIONS

Adelson, E. H.; Bergen, J. R.,"The Plenoptic Function and the Elements of Early Vision", Computational Models of visual Processing, MIT Press, pp. 3-20.
(Continued)

*Primary Examiner* — Xi Wang
(74) *Attorney, Agent, or Firm* — Siritzky Law, PLLC

(57) ABSTRACT

A plenoptic imaging device according to the invention comprises an image multiplier (130) for obtaining a multitude of optical images of an object or scene and a pick-up
(Continued)

system (140) for imaging at least some of the multitude of images to a common image sensor (170) during the same exposure of the sensor.

19 Claims, 13 Drawing Sheets

(51) Int. Cl.
| | |
|---|---|
| H04N 9/083 | (2006.01) |
| H04N 13/02 | (2006.01) |
| G02B 5/04 | (2006.01) |
| G02B 27/08 | (2006.01) |
| G02B 5/02 | (2006.01) |
| G02B 5/20 | (2006.01) |

(52) U.S. Cl.
CPC ....... *H04N 13/0217* (2013.01); *G02B 5/0273* (2013.01); *G02B 5/201* (2013.01); *G02B 27/08* (2013.01); *H04N 13/0214* (2013.01); *H04N 2213/001* (2013.01)

(58) Field of Classification Search
USPC .................... 348/760, 340, 290, 337; 355/67
See application file for complete search history.

(56) References Cited

U.S. PATENT DOCUMENTS

| | | | | |
|---|---|---|---|---|
| 3,971,065 | A | 7/1976 | Bayer | |
| 4,733,960 | A | 3/1988 | Bennett | |
| 5,900,942 | A | 5/1999 | Spiering | |
| 8,228,417 | B1* | 7/2012 | Georgiev | G03B 11/00 348/335 |
| 8,290,358 | B1* | 10/2012 | Georgiev | G03B 35/10 396/326 |
| 2007/0041722 | A1* | 2/2007 | Fong | G03B 15/03 396/176 |
| 2007/0216905 | A1 | 9/2007 | Han et al. | |
| 2007/0230944 | A1* | 10/2007 | Georgiev | H04N 5/2254 396/322 |
| 2008/0187305 | A1* | 8/2008 | Raskar | G02B 27/0075 396/268 |
| 2008/0284921 | A1* | 11/2008 | Hirata | G02B 27/2278 348/756 |
| 2009/0262182 | A1* | 10/2009 | Javidi | H04N 13/0232 348/46 |
| 2011/0002505 | A1 | 1/2011 | Barrow | |
| 2011/0090388 | A1* | 4/2011 | Yoon | H04N 5/232 348/333.01 |
| 2012/0154595 | A1* | 6/2012 | Sassi | G06F 3/017 348/164 |
| 2013/0076931 | A1* | 3/2013 | Border | G02B 27/0075 348/222.1 |

FOREIGN PATENT DOCUMENTS

| | | |
|---|---|---|
| GB | 796102 | 6/1958 |
| JP | S6134520 | 2/1986 |
| JP | H01119867 | 1/1989 |
| JP | 2009128421 | 11/2009 |

OTHER PUBLICATIONS

Adelson, E.; Wang, J., "Single Lens Stereo with a Plenoptic Camera", IEEE Trans. PAMI14, vol. 2, pp. 99-106.
Bonnet, H.; Abuter, R.; Baker, A. et al., "First Light of SINFONI at the VLT", ESO Messenger, (2004), vol. 117, No. 17, pp. 17-24.
Cao, X.; Tong, X.; Dai, Q.; Lin, S., "High-Resolution Multi-Spectral Video Capture with a Hybrid Camera System", Proc. CVPR, (2011), pp. 297-304.
Cook, R. L.; Derose, T., "Wavelet Noise", ACM TOG, (2005), vol. 24, No. 3, pp. 735-744.
Debevec, P. E.; Malik, J., "Recovering High Dynamic Range Radiance Maps from Photographs", Proc. SIGGRAPH, (1997), pp. 369-378.
Descour, M.; Dereniak, E., "Computed-tomography Imaging Spectrometer: Experimental Calibration and Reconstruction Results", Appl. Optics, (1995), vol. 34, No. 22, pp. 4817-4826.
Du, H.; Tong, X.; Cao, X.; Lin, S., "A Prism-Based System for Multispectral Video Acquisition", Proc. ICCV, (2009), pp. 175-182.
Gehm, M. E.; John, R.; Brady, D. J.; Willett, R. M.; Schulz, T. J., "Single-Shot Compressive Spectral Imaging with a Dual-Disperser Architecture", Optics Exp., (2007), vol. 15, No. 21, pp. 14013-14027.
Goldstein, D. H., Polarized Light, CRC Press.
Gortler, S.; Grzeszczuk, R.; Szelinski, R.; Cohen, M., "The Lumigraph", Proc. SIGGRAPH, (1996), pp. 43-54.
Habel, R.; Kudenov, M.; Wimmer, M., "Practical Spectral Photography", CGF31, (2012), vol. 2, pp. 449-458.
Han, J. Y.; Perlin, K., "Measuring Bidirectional Texture Reflectance with a Kaleidoscope", Proc. SIGGRAPH, (2003), vol. 74, pp. 1-748.
Hegedus, R.; Szel, G.; Horvath, G., "Imaging polarimetry of the circularly polarizing cuticle of scarab beetles (*Coleoptera: Rutelidae, Cetoniidae*", Vision Research, (2006), vol. 46, pp. 2786-2797.
Horn, B. K. P.; Schunck, B. G., "Determining Optical Flow", Artif. Intell., (1981), vol. 17, No. 1-3, pp. 185-203.
Horstmeyer, R.; Euliss, G.; Athale, R.; Levoy, M., "Flexible Multimodal Camera Using a Light Field Architecture", Proc. ICCP, (2009), pp. 1-8.
Ihrke, I.; Wetzstein, G.; Heidrich, W., "A Theory of Plenoptic Multiplexing", Proc. CVPR, (2010), pp. 1-8.
Ihrke, 1., Color Calibration Toolbox for Matlab, (2012).
Isaksen, A.; McMillan, L.; Gortler, S. J., "Dynamically Reparameterized Light Fields", Proc. SIGGRAPH, (2000), pp. 297-306.
Kudenov, M.; Dereniak, E., "Compact Snapshot Real-Time Imaging Spectrometer", In SPIE Conf. on Elec.-Opt. Rem. Sens., Phot. Tech., and Appl. V, (2011), pp. 81860W-1,81860W-12.
Lanman, D.; Raskar, R.; Agrawal, A.; Taubin, G., "Shield Fields: Modeling and Capturing", 3D Occluders. ACM TOG, (2008), vol. 27, No. 5, p. 131.
Levoy, M.; Hanrahan, P., "Light Field Rendering", In Proc. SIGGRAPH, (1996), pp. 31-42.
Levoy, M.; Chen, B.; Vaish, V.; Horowitz, M.; Mcdowall, I.; Bolas, M., "Synthetic Aperture Confocal Imaging", ACM TOG, (2004), vol. 23, No. 3.
Lippmann, G., "La Photographie Inte'grale", Academie Des Sciences, (1908), vol. 146, pp. 446-451.
Lumsdaine, A.; Georgiev, T., "The Focused Plenoptic Camera", Proc. ICCP, (2009), pp. 1-8.
Mann, S.; Picard, R. W., "Being 'Undigital' with Digital Cameras: Extending Dynamic Range by Combining Differently Exposed Pictures", Proc. IS&T, (1995), pp. 442-448.
McGuire, M.; Matusik, W.; Pfister, H.; Chen, B.; Hughes, J. F.; Nayar, S. K., "Optical Splitting Trees for High-Precision Monocular Imaging", IEEE CG&4.27, (2007), vol. 2, pp. 32-42.
Mitsunaga, T.; Nayar, S. K., "Radiometric Self Calibration", In Proc. CVPR, (1999), pp. 374-380.
Narasimhan, S.; Nayar, S., "Enhancing Resolution along Multiple Imaging Dimensions using Assorted Pixels", IEEE Trans. PAMI27, (2005), vol. 4, pp. 518-530.
Nayar, S.; Mitsunaga, T., "High Dynamic Range Imaging: Spatially Varying Pixel Exposures", In Proc. CVPR, (2000), vol. 1, pp. 472-479.
Neumann, L.; Hegedus, R.; Horvath, G.; Garcia, R., "Applications of High Precision Imaging Polarimetry", Proc. Computational Aesthetics in Graphics, Visualization and Imaging, (2008), pp. 89-97.
Ng, R.; Levoy, M.; Bre'Dif, M.; Duval, G.; Horowitz, M.; Hanrahan, P., "Light Field Photography with a Hand-Held Plenoptic Camera", Tech. Rep. Computer Science CSTR, (2005).

(56) References Cited

OTHER PUBLICATIONS

Ng, R., "Fourier Slice Photography", ACM TOG, (2005), vol. 24, No. 3, pp. 735-744.

Okamoto, T.; Yamaguchi, 1., "Simultaneous Acquisition of Spectral Image Information", Optics Lett., (1991), vol. 16, No. 16, pp. 1277-1279.

Park, J.-I.; Lee, M.-H.; Grossberg, M. D.; Nayar, S. K., "Multispectral Imaging Using Multiplexed Illumination", Proc. ICCV, (2007), pp. 1-8.

Pezzaniti, J. L.; Chenault, D.; Roche, M.; Reinhardt, J.; Pezzaniti, J. P.; Schultz, H., "Four Camera Complete Stokes Imaging Polarimeter", Proc. SPIE 6972, Polarization: Measurement, Analysis, and Remote Sensing, (2008), vol. III, pp. 69720J-1,69720J-12.

Reinhard, E.; Ward, G.; Debevec, P.; Pattanaik, S.; Heidrich, W.; Myszkowski, K., High Dynamic Range Imaging: Acquisition, Display and Image-Based Lighting, Morgan Kaufmann Publishers.

Reshetouski, I.; Manakov, A.; Seidel, H.-P.; Ihrke, I., "Three-Dimensional Kaleidoscopic Imaging", Proc. CVPR, (2011), pp. 353-360.

Rump, M.; Klein, R., "Spectralization: Reconstructing spectra from sparse data", Proc. EGSR, (2010), pp. 1347-1354.

Schechner, Y.; Nayar, S., "Generalized Mosaicing: Polarization Panorama", IEEE Trans. PAMI, (2005), vol. 27, No. 4, pp. 631-636.

Schechner, Y.; Narasimhan, S. G.; Nayar, S. K., "Instant Dehazing of Images using Polarization", Proc. CVPR, (2001), pp. 325-332.

Tocci, M. D.; Kiser, C.; Tocci, N.; Sen, P., "A Versatile HDR Video Production System", ACM TOG, (2011), vol. 30, p. 4.

Toyooka, S.; Hayasaka, N., "Two-Dimensional Spectral Analysis using Broad-Band Filters", Optical Communications, (Apr. 1997), vol. 137, pp. 22-26.

Veeraraghavan, A. et al "Dappled Photography: Mask Enhanced Cameras for Heterodyned Light Fields and Coded Aperture Refocussing", ACM TOG, (2007), vol. 26, No. 3, p. 69.

Wanner, S.; Goldluecke, B., "Globally Consistent Depth Labeling of 4D Lightfields", Proc. CVPR, (2012), pp. 41-48.

Wanner, S.; Goldluecke, B., "Spatial and Angular Variational Super-Resolution of 4D Light Fields", Proc. ECCV, (2012), pp. 608-621.

Wetzstein, G.; Ihrke, I.; Lanman, D.; Heidrich, W., "Computational Plenoptic Imaging", CGF, (2011), vol. 30, No. 8, pp. 2397-2426.

Wilburn, B.; Joshi, N.; Vaish, V. et al., "High Performance Imaging using Large Camera Arrays", ACM TOG, (2005), vol. 24, No. 3, pp. 765-776.

Zhou, C.; Nayar, S., "Computational Cameras: Convergence of Optics and Processing", IEEE Trans. IP, (Dec. 2011), vol. 20, No. 12, pp. 3322-3340.

WIPO, International Preliminary Report on Patentability Chapter I, PCT/EP2014/052747, dated Aug. 18, 2015.

WIPO, Written Opinion of the International Search Authority PCT/EP2014/052747, dated Aug. 13, 2015.

WIPO, International Search Report, PCT/EP2014/052747, dated Aug. 21, 2014.

EPO Communication from the Examining Division including Annex to the communication, for EP2957099, 7 pgs., dated Nov. 25, 2016.

EPO, Non-patent literature cited during the examination procedure, ("Flange focal distance, 2 pgs.") in EP2957099, dated Nov. 24, 2016.

EPO file for EP2957099 (Application No. 14707104.7), 188 pgs.

* cited by examiner

Fig. 5
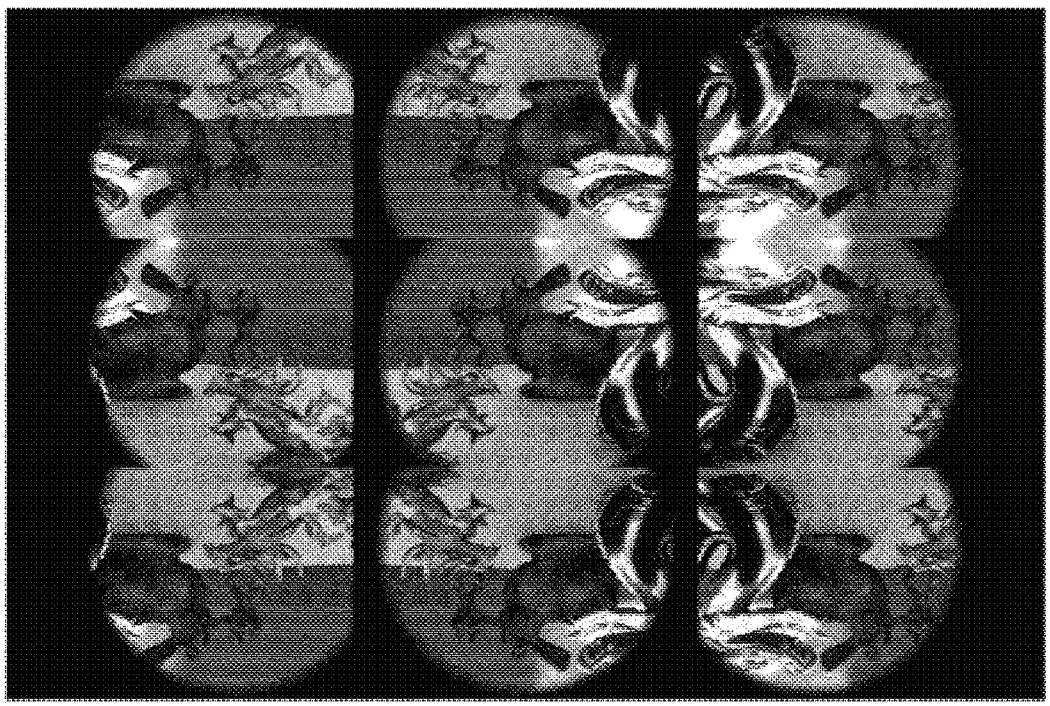
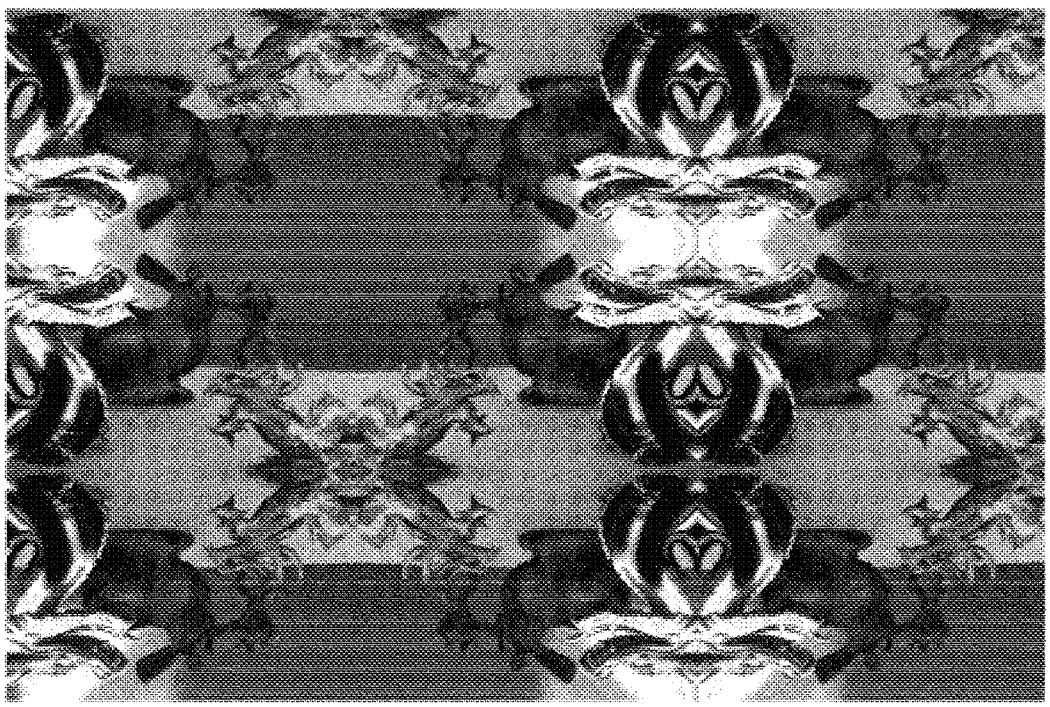

Fig. 6

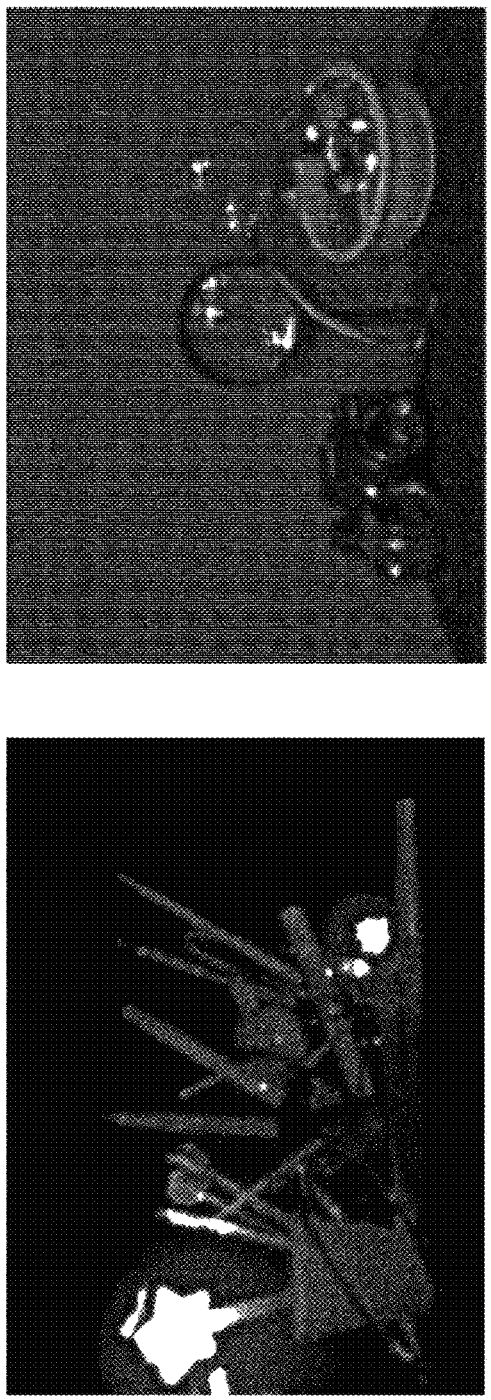
Fig. 8

PLENOPTIC IMAGING DEVICE

CROSS-REFERENCE TO RELATED APPLICATIONS

This application is a National Stage of International Application No. PCT/EP2014/052747, filed Feb. 12, 2014, which claims the benefit of (i) U.S. Provisional Application No. 61/764,084, filed Feb. 13, 2013; and (ii) and EP 13155094.9, filed Feb. 13, 2013, the entire contents of both of which are hereby fully incorporated herein by reference for all purposes.

The present invention relates to a non-permanent, reconfigurable camera add-on for high dynamic range, multispectral, polarization, and light-field imaging.

TECHNICAL BACKGROUND

Imaging dimensions of the plenoptic function has been a long-standing goal [Adelson and Bergen 1991]. Access to the full properties of the incident light on a sensor, e.g. the direction, spectrum, the temporal variation, the polarization and other properties has a large number of applications in scientific imaging, industrial quality control, remote sensing, computer vision, and computer graphics.

Numerous specialized devices, ranging from space-borne imagers to microscope cameras, exist for classic multispectral and polarization imaging. More recently high dynamic range imaging and light-field capture have become a major focus in computer graphics. In order to gain access to these physical dimensions of an image, the light integration has to be adapted.

In a temporal multiplexing approach, an image stack is recorded and filters of different exposures are placed in the light path. This approach can only be applied to static or quasi-static scenes. The latter requires a registration of the individual images which is a difficult problem in itself. In a hardware parallel acquisition approach, the optical image is multiplied by means of a beam-splitter arrangement and projected onto different sensor units that are spatially de-localized. Different optical pre-filters can be inserted into the different optical light paths. This arrangement allows for dynamic scenes to be imaged. It comes, however, at the price of large, expensive, and bulky setups that have to be custom built. Further, synchronization and radiometric calibration of the different sensors with respect to each other is another problematic aspect. Finally, in a spatial multiplexing approach, a single sensor unit is employed where every pixel is associated with a different optical pre-filter. This design allows a single-exposure (snapshot) retrieval. Its most familiar application is color imaging via a color filter array. Presently, this requires custom sensor designs or the permanent modification of the standard sensors.

PRIOR ART

General plenoptic image acquisition is described in Wetzstein et al. [2011] and Zhou et al. [2011]. Snapshot imaging captures differently-filtered images in a single exposure. A simple hardware-parallel setup is to place several cameras close to each other (e.g., [Wilburn et al. 2005]), each with a different pre-filter, or modified recording parameters. Nonetheless, if light-field imaging is not intended, as in most plenoptic dimensions other than direction, the different viewpoints of the cameras need to be compensated for. Optical flow [Horn and Schunck 1981] can be applied, but in practice, it is of limited utility since it is based on the brightness constancy assumption which may be violated when different optical pre-filters are being used.

For a monocular snapshot, the scene is to be observed through a common main lens to avoid parallax between the differently-filtered images. A hardware-parallel solution is to use optical splitting trees [McGuire et al. 2007]. The light path is separated into different branches by a system of beam splitters. At the end of each light path, a standard sensor is installed and a separate optical filter can be introduced in each one of them. This mode of imaging is employed in a number of practical systems for HDR imaging [Tocci et al. 2011], polarization imaging [Pezzaniti et al. 2008], and multispectral imaging [Spiering 1999; McGuire et al. 2007]. Single-sensor setups often make use of multiplexing, which comes in two flavors, direct multiplexing, where the optically pre-filtered images are re-distributed on the sensor and directly imaged, and computational multiplexing, where super-positioned plenoptic quantities are observed. In the latter case, a computational inversion has to recover the plenoptic quantities of interest. Often, this inversion step is ill-posed and has to be regularized using prior information about the signal.

Capturing different color primaries has manifold applications in computer graphics and vision, e.g., relighting beyond white point adjustment, or improved tracking and segmentation accuracy [Park et al. 2007; Cao et al. 2011] and general scientific imaging, e.g., satellite-based remote sensing, microscopy, optical quality control. Typically, direct multiplexing approaches use a dispersing element inserted into the optical path, while light is simultaneously redirected or blocked from reaching nearby sensor pixels that record different wavelength information. For color photography, the Bayer filter is often used, which is placed directly in front of the sensors. In principle, various primaries or other plenoptic dimensions [Narasimhan and Nayar 2005] can be captured in this way. Other examples include the use of mirror arrays, so-called image splicers [Bonnet et al. 2004], or blocking masks [Du et al. 2009; Cao et al. 2011]. The resulting output is typically of low spatial resolution. A recent trend is to capture a high-resolution RGB image in conjunction with the low-resolution multispectral image and to transfer the spectral information to the high-resolution RGB image [Rump and Klein 2010; Cao et al. 2011].

High Dynamic Range HDR imaging circumvents the dynamic-range restriction of standard imaging sensors. Exposure sequences are predominantly used in practice. Snapshots are possible with varying pixel exposures [Nayar and Mitsunaga 2000], but this approach shares the previously-mentioned drawbacks.

The polarization of the field reflected off a scene object is affected by material type, roughness, surface orientation, the polarization state of the illumination, as well as scattering properties of the surrounding medium. Polarization, hence, carries important information about material and scene properties, enabling, e.g., dehazing [Schechner et al. 2001], or the removal and editing of specularities [Neumann et al. 2008]. While for multispectral imaging relatively simple physical wavelength splitting mechanisms via dispersion or diffraction are possible (birefringence is only a comparatively small effect). Hence, fast temporal multiplexing by filter wheels or beam splitting [Pezzaniti et al. 2008] is applied. Alternatively, the generalized mosaic of Schechner and Nayar [Schechner and Nayar 2005] can be used, which has also been applied to other plenoptic dimensions.

Light fields represent the angular variation of incident light at every sensor element. Even though the principles have been invented a century ago [Ives 1903; Lippmann 1908], only the advent of digital camera technology made them practical. Virtual refocussing and view point change [Isaksen et al. 2000; Ng 2005] within the limits of the main camera lens, but also depth estimation [Wanner and Goldluecke 2012a; Wanner and Goldluecke 2012b] are possible applications.

The primary means to record monocular, i.e. in-camera, light fields is to employ lenslet arrays [Adelson and Wang 1992; Ng et al. 2005], but also attenuation masks (placed closely to, but not incident at the sensor) can be used [Veeraraghavan et al. 2007; Lanman et al. 2008], even though the latter leads to a lower SNR because the light throughput is inferior. A camera aperture exceeding light field was achieved by Levoy et al. [2004] who use a mirror array for synthetic aperture imaging and projection. Most related to the invention is Han et al. [2003], who obtain hemispherical imaging of flat objects via a kaleidoscopic mirror. This arrangement to measure bidirectional texture functions was extended to three-dimensional objects by Reshetouski et al. [2011].

OBJECT OF THE INVENTION

It is therefore an object of the invention to enable snapshot imaging of the plenoptic dimensions of an image, however, while avoiding the necessity of custom camera designs. It is a further object of the invention to design an optical element that can reversibly be combined with any existing imaging device, such as a DLR, a mobile phone or tablet camera, an industrial camera, cinema camera or a microscope, but can easily be removed for normal use, thereby enabling widespread adoption of plenoptic imaging by users.

BRIEF SUMMARY OF THE INVENTION

This object is achieved by a plenoptic imaging device according to the independent claim. Advantageous embodiments are defined in the dependent claims.

According to the invention, a reversible modification of standard camera hardware to flexibly acquire several plenoptic dimensions, such as wavelength, time, and direction is achieved by a simple optical design. In addition, it can be used for high dynamic range and polarization imaging, in photo and video cameras alike.

The inventive device physically multiplies an optical image by means of repeated mirror operations, which makes it suitable for time-crucial shots. The resulting array of equivalent images maintains the plenoptic properties of the physical image. These copies are projected into a plane where they are optically pre-filtered and then imaged by a 1:1 imaging unit onto the sensor of a standard camera. This optical element can easily and reversibly be inserted between the lens and body of a standard camera, converting it into a high dynamic range, multispectral, polarization, light-field imaging unit or combinations thereof, depending on the configuration of the proposed optical element.

The invention comprises a novel optical design using a direct spatial multiplexing scheme for monocular snapshot plenoptic imaging. It relies on inter-reflections within mirror systems and can be added nonpermanently to any standard camera and be reconfigured to image different plenoptic dimensions in a unified design. In contrast to other approaches, the light-field design according to the invention is most suitable for imaging at a low directional, but high spatial resolution. High-quality refocusing and view-point changes are possible and in unprecedented large virtual apertures at a high spatial resolution can be achieved.

Comparing to the established lenslet-based design, the inventive solution explores an orthogonal end of the design space. While lenslet-based light-field cameras offer a high angular resolution, their spatial resolution is limited and has to be interpolated to enable an acceptable image size. Contrary, the inventive design is most suitable for imaging at a high spatial resolution with a low number of angular views. Nevertheless, the angular resolution has to be interpolated to enable convincing refocusing effects. These tradeoffs are an inherent feature of the two designs. Decreasing the angular resolution to gain spatial resolution is difficult for the lenslet-based design since the size of the micro lenses represents a limiting factor. In addition, color imaging with color-filter arrays would become infeasible when approaching low angular resolutions. In contrast, increasing the number of angular views in the inventive design makes the device size less feasible. A unique advantage of the inventive design is that the depth of field of the individual light-field views can be regulated by the aperture of the pickup lens. Light field aliasing can therefore be controlled by the user. The maximum achievable parallax is in both cases limited by the aperture size of the main lens and this performance parameter is the same for both designs.

BRIEF SUMMARY OF THE FIGURES

These and other aspects and advantages of the invention will become more apparent when considering the following detailed description of various embodiments of the invention, in conjunction with the annexed drawing in which

FIG. 5 shows the effect of the light-field pupil-matching system described in connection with FIG. 4. (simulation): without pupil-matching lens (top), with pupil-matching lens (bottom). Without adapting the pupils of the main lens and image multiplier, large parts of the dragons are vignette out.

FIG. 6 shows how the aperture of the pickup system determines the depth of field of the light-field views (shown is the center view, but other views behave similarly). Top: pickup aperture open, depth of field effects can be clearly observed. Bottom: pickup aperture closed, the views are sharply imaged over the full depth range.

FIG. 8 shows tone-mapped results of three example scenes captured with the prototype high dynamic range setup.

DETAILED DESCRIPTION

Figure 1:
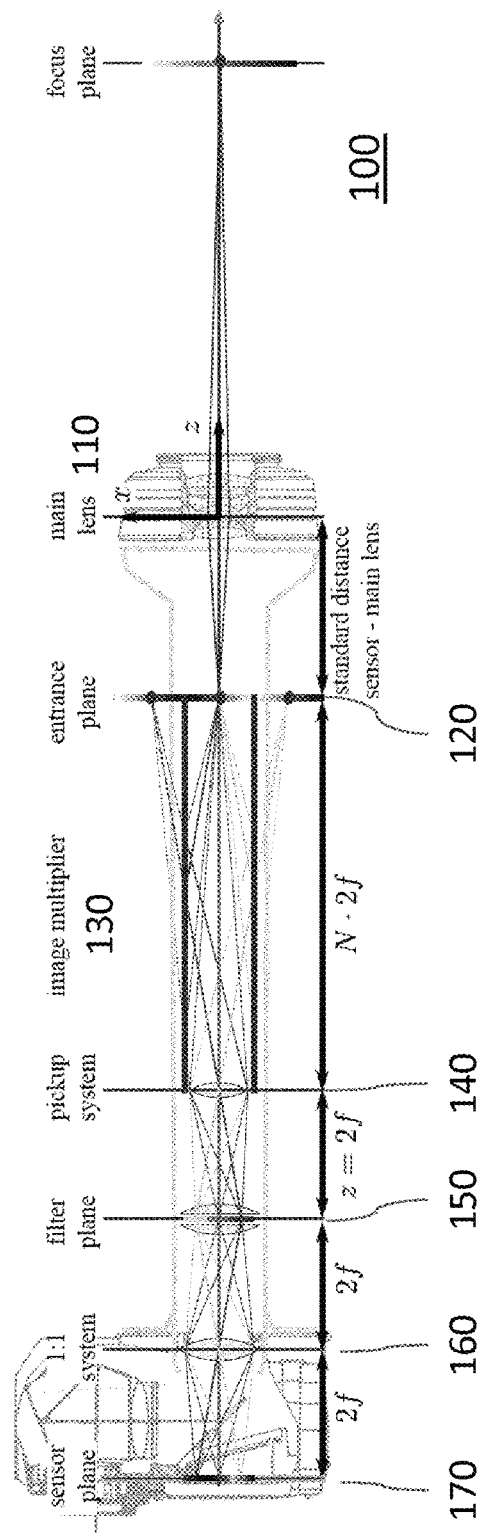
FIG. 1 shows a schematic overview of a plenoptic imaging device according to a first embodiment of the invention. Differently-colored light paths indicate differently-filtered copies of the same scene point.

FIG. 1 shows a schematic overview of a plenoptic imaging device according to a first embodiment of the invention.

The original image of the standard camera lens 110 is projected on a diffuser screen 120 that is placed in the location that would usually be occupied by the cameras sensor. This diffuser 120 is observed through an image multiplier 130, e.g. a mirror arrangement, which produces a number of copies of the original image that still carry the physical information of the plenoptic function, except for directional light variation. A pick-up imaging system 140 projects the information exiting the mirror system on a filter plane 150. This projected image on the filter plane 150 has the dimensions of the original sensor, but contains spatially separated copies of the original image. These copies can be individually modulated by optical filters placed in the filter plane, hereby, enabling, among others, snapshot high dynamic range, multispectral, and polarization imaging. It would be possible to place a custom sensor in this plane with the according filters attached to its surface. In order to obtain a reversible add-on, the filtered results are projected onto the original camera sensor 170 by employing a 1:1 imaging system 160.

The main lens 110 is imaging the scene onto a plane that would typically contain the camera sensor. According to the invention, a diffuser 120 is placed at this location. Its size matches what the main optics are optimized for, as important imaging characteristics like the field of view directly depend on it. The diffuser 120 acts as a rear-projection screen, i.e., observing it from the left shows the image that would be observed by a sensor at this location. Intuitively, this image appears identical when viewed from different directions, as the diffuser of the present embodiment removes all directional variation via its bidirectional transmittance distribution function (BTDF), but otherwise all physical attributes of the plenoptic function are maintained.

The image multiplier 130 uses multiplexing to transfer image content from the diffuser into the directional component of the plenoptic function. It is important that the diffuser lobe is wide enough to accommodate the different viewing directions that create the image copies, otherwise, vignetting occurs. However, if the lobe is too wide, stray light is spread into the system. The diffuser scattering profile should therefore be adapted to the maximum observation angle α, see figure, for best performance and light efficiency of the system.

In addition, a pupil matching lens may be used to adapt the entrance pupil of the image multiplier to the exit pupil of the main lens. In the present embodiment, this lens homogenizes the illumination picked up from the entrance plane in the case of a weak diffuser for which strong and directionally varying illumination may otherwise manifest itself in a non-uniform transmission of the system.

Once the image is visible on the diffuser screen 120 the image multiplier 130 copies it, e.g. by means of mirror reflections. A kaleidoscope with parallel walls is a suitable multiplier, resulting in a virtual plane of image copies.

Since the width and the height of the image multiplier are defined by the sensor size, the only variable is its length along the optical axis. This length is determined by the 1:N minification that is to be achieved by the pickup imaging system and by its focal length $f_{ps}$. The effect of the pickup imaging system is that N×N views of the diffuser are compressed to the size of a standard sensor image and made accessible as a real image in the filter plane. Following geometrical optics, the relation between image multiplier length N·z, number of image copies N, and focal length of the pickup system $f_{ps}$ is approximately given by the thin lens formula $$\frac{1}{z} + \frac{1}{N \cdot z} = \frac{1}{f_{ps}}; \frac{N}{N+1} z = f_{ps}. \quad (1)$$

In practice, this means that a short focal length $f_{ps}$ and a low image multiplication factor N lead to short lengths of the image multiplier.

Another aspect of the design is the aperture of the pickup lens. In conjunction with the diffuser lobe, it determines the light efficiency of the system. Hence, it should be chosen as large as possible. A large aperture for the pickup system does not involve a loss of image quality in case of a planar object, i.e. the entrance plane. In general however, it is difficult to obtain large aperture for short focal length lenses, as they become bulky and have a strong curvature, leading to significant deviations from the geometric optics model. When setting the image multiplier length, a tradeoff exists between the aperture and the focal length of the pickup system. An additional effect of the length parameter is the observation angle under which the different copies of the entrance plane are seen. A larger length leads to smaller observation angles and therefore to weaker diffusion requirements.

For example, the field of view of the pickup system may be dimensioned according to how many copies need to be seen, depending on the sensor size and the focal length of the pickup system. Then, the remaining density may be set accordingly.

Figure 2:
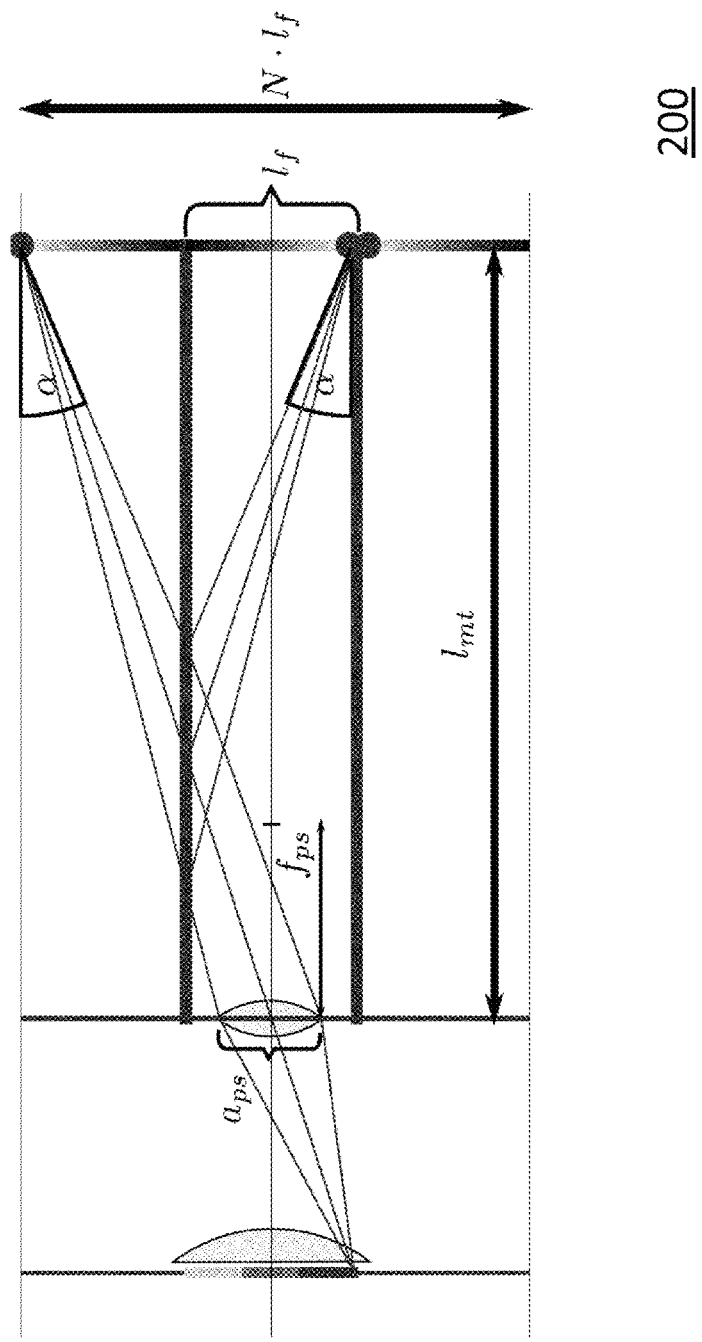
FIG. 2 illustrates how the maximum observation angle a at the entrance plane may be obtained when observing a point at the image boundary of one of the outermost mirrored copies. The maximum angle is formed by the ray exiting the pickup-system aperture on the opposite side.

FIG. 2 illustrates how the maximum observation angle α at the entrance plane may be obtained when observing a point at the image boundary of one of the outermost mirrored copies.

More specifically, the maximum observation angle α is given by $$\alpha = \tan^{-1}\left(\frac{(N/2 \cdot l_f + \alpha_{ps}/2)}{l_{mt}}\right),$$

where $l_f$ is the original sensor (and therefore the diffuser) size, N is the targeted number of image copies, $\alpha_{ps}$ the aperture of the pickup lens, and $l_{mt}$ the length of the image multiplier. The angle α can be reduced by a longer image multiplier, a low number of image copies, a smaller sensor size, and to a minor effect by reducing the aperture of the pickup system.

For the best optical quality and geometric accuracy, the multiplier can be made from glass, utilizing the effect of total internal reflection to create the mirror images. In this case, its length is approximately multiplied by the refractive index of the glass, which can be derived by considering two planar air/glass-glass/air interfaces. The condition on the maximum observation angle does not change; since the diffusion lobe refracts into the image multiplier, it narrows by the same amount as the maximum observation angle.

The system generates a real image of N×N copies of the physical image that a standard camera would have captured and it makes these copies accessible in the filter plane where an array of optical filters allows gaining access to the different plenoptic dimensions.

In order to prevent the image in the filter plane from diverging in the direction of the sensor, causing vignetting, the exit pupil of the image multiplier system may be adapted to the entrance pupil of the 1:1 imaging system. In the present embodiment, a pair of plano-convex lenses is inserted at the filter plane that together form an additional optical relay system between the aperture plane of the pickup system and that of the 1:1 imaging system.

The 1:1 imaging system 160 projects the N×N optically pre-filtered copies of the diffuser-plane image onto the sensor 170 that integrates the incoming photons. Since 1:1 imaging occurs at two focal lengths, the system is dimensioned with respect to the focal length f of the 1:1 imaging lens. The choice of placing the pickup system 140 at a distance of 2f from the filter plane is determined by keeping all imaging planes of the system equal in size to the original sensor dimensions. The overall length of the system is therefore (6+2N)·f and the individual lens components have focal lengths of 2f for the pair of the planoconvex lenses and 2N/(N+1)f for the pickup lens.

Figure 3:
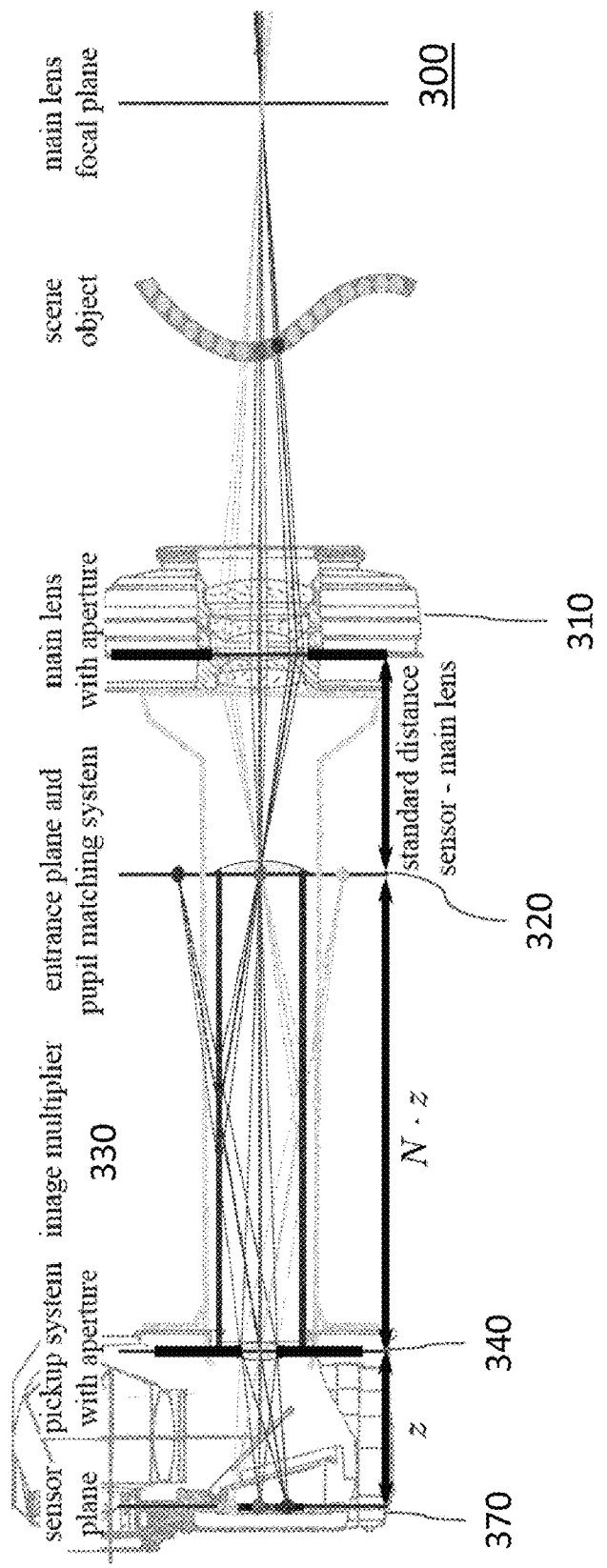
FIG. 3 shows a schematic overview of a plenoptic imaging device according to a second embodiment of the invention. Differently-colored light paths indicate different viewing directions in the entrance plane of the system, which corresponds to the micro-lens plane in lenslet-based light-field cameras.

FIG. 3 shows a design for an imaging device according to a second embodiment of the invention that can be used for light-field imaging. Here, the filter plane and the 1:1 imaging system of the filter-based design are omitted and the output of the pickup system is imaged directly onto the sensor. The light-field imaging effect is based on a subsampling of the main lens aperture [Ng et al. 2005].

By omitting the diffuser component, one preserves the directionality of the plenoptic function on the entrance plane and can sample it in the sub-images. A difficulty is the divergent nature of the image cast by the main lens onto the entrance plane, see FIG. 4 (a). For clarity, a pinhole-like aperture of the pickup system is shown, including two scene points that are imaged from three directions each. One sees that vignetting occurs; the blue view is completely blocked for the upper scene point whereas the green view is missing for the lower scene point. The problem comes from the mismatch between the exit pupil of the main lens and the entrance pupil of the pickup system. The pickup system images regions of the main lens aperture far outside its physical limits (FIG. 5, top).

Figure 4:
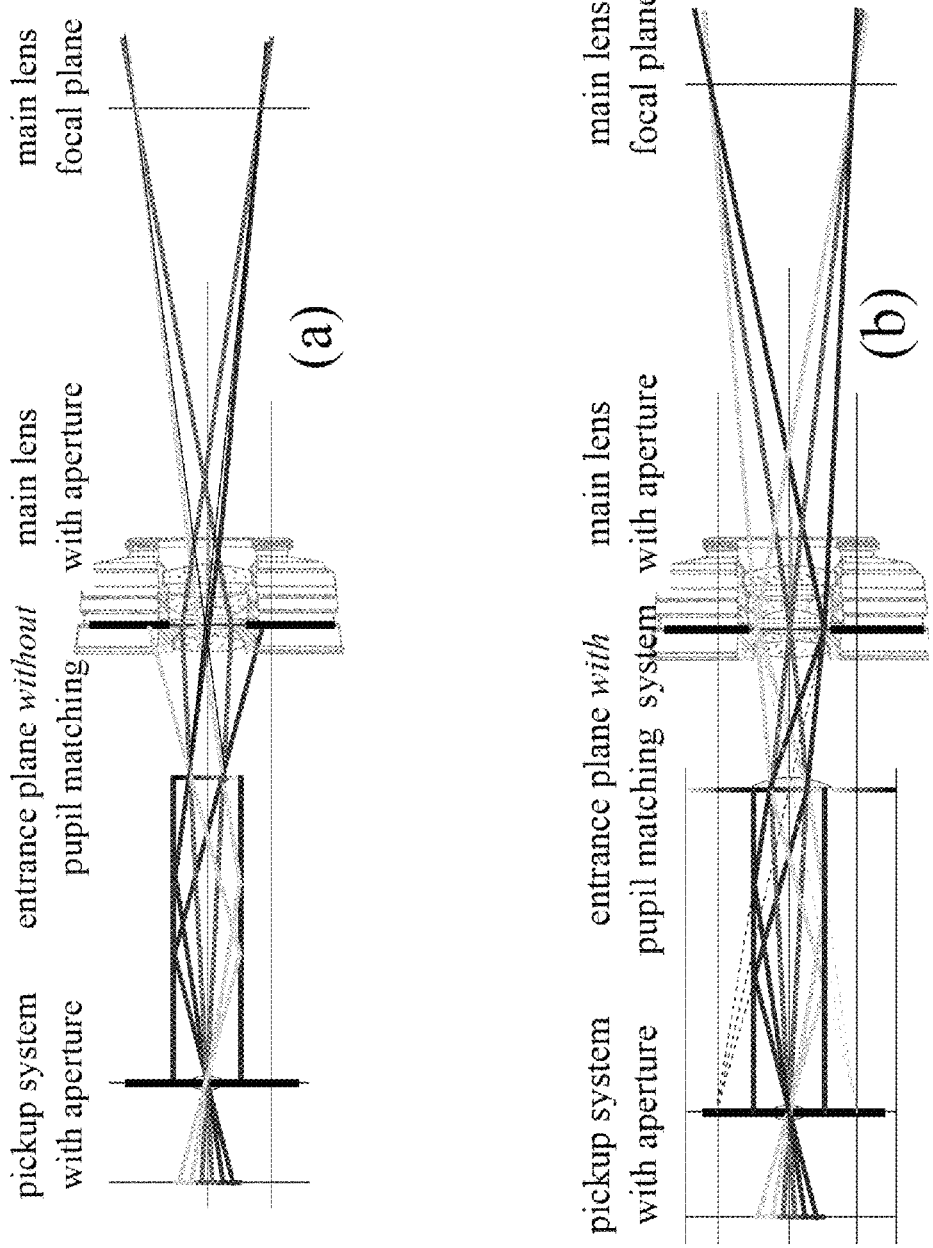
FIG. 4 illustrates how, for the embodiments shown in FIGS. 1 and 3, the exit pupil of the main lens and the entrance pupil of the image multiplier have to be matched.

This problem is circumvented by introducing a pupil-matching system that images the aperture plane of the main lens onto the aperture plane of the pickup system. The mirror operation introduced by the image multiplier generates virtual viewpoints through the mirrored pickup apertures that are imaged onto stable regions of the main lens aperture. As shown in FIG. 4 (b), this matches the exit pupil of the main lens to the entrance pupil of the pickup system. Now the condition for non-vignetted imaging only depends on the choice of the maximum observation angle α. It should be designed to match the maximal angle of the exit pupil of the main lens. A visual example is shown in FIG. 5 (bottom).

An additional modification is to equip the pickup system with an aperture. This way, the depth-of-field of the individual light field views can be regulated at the expense of light efficiency. This option is not available in any existing integrated light-field camera design; e.g., in a lenslet-based lightfield camera [Ng et al. 2005] this effect cannot be controlled since each of the micro-lenses would have to be equipped with an individual aperture all of which would have to be moved in a synchronized manner.

FIG. 6 (bottom) shows the improvements in depth-of-field by trading light efficiency that can be obtained by stopping down this aperture.

Figure 7:
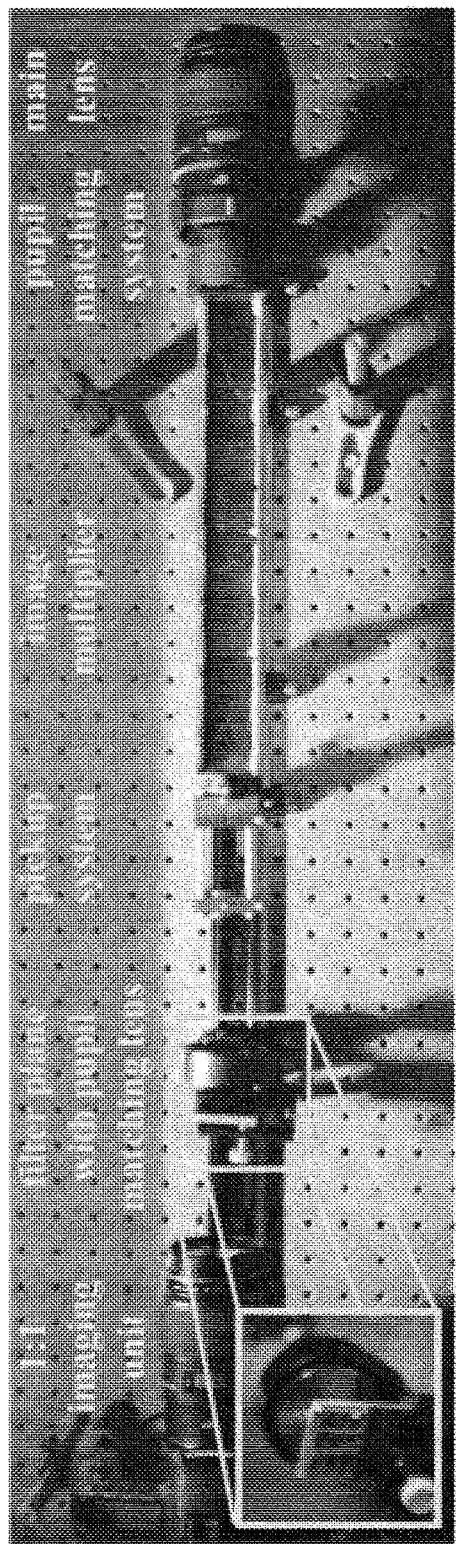
FIG. 7 shows a photograph of a prototype setup of an embodiment of the invention. The inset shows a closeup on the filter plane assembly.

FIG. 7 shows a prototype implementation of a device according to the invention. Due to experimental constraints and the limited availability of suitable stock parts, the practical implementation differs slightly from the embodiments discussed in connection with FIGS. 1 and 3. More specifically, an optical table setup of the proposed design was built in order to evaluate its effectiveness. The camera is a Canon EOS 5D mark II with 22 M pixels resolution, featuring a full-frame sensor. The system generates 3×3 copies of the scene for the filter-based design and 3×3 different views on the scene for light-field imaging case. This choice leads to 9 different exposure settings for HDR imaging OR 27 different spectral measurements for the multispectral imaging case since the 9 filters are imaged by three color channels each, 9 channels for polarization measurements OR 3×3 different views for the light-field imaging case.

The diffuser of the prototype has a thickness of ≈1 mm and polarization preserving properties since it was designed for polarization based 3D rear-projection screens (Screen-Tech GmbH, material type ST-Professional-DCF). The diffuser scattering profile falls to 50% transmittance at about 20" 428 off-axis, which is well above the maximum observation angle of the system (12.95" 429 for 15 mm pickup lens aperture). The requirements for the elimination of the directional light variation are thus met.

To create copies of the imaged scene, a rectangular kaleidoscope, 36 mm×24 mm×300 mm in size was employed. It was made from optical front-surface mirrors and constructed by an artisan kaleidoscope maker (Kaleidoskope GmbH). Since an individual pixel covers about ≈18 μm of diffuser surface, a perfectly parallel arrangement of the mirrors is necessary. Due to misalignment, the kaleidoscope suffers from some imaging imperfections that most prominently show in the corner views of the kaleidoscope. In a alternative implementation, a rectangular prism utilizing total internal reflection can be used as an accurate image multiplier.

While an ideal design features two plano-convex lenses with the filter array being placed in the aperture of the resulting effective bi-convex lens, in practice this arrangement is more easily implemented by a single bi-convex lens at a small distance to the filter array. Shifting the filter array out of the aperture has the additional benefit of masking imperfections in the optical filters themselves: manual construction of the filter array results in unavoidable scratches and other minor deviations from a perfectly planar optical filter of infinite width. If the filter array was placed directly into the aperture of the filter-plane pupil matching arrangement, these imperfections would readily become apparent in the recorded images, while they are now blurred and less noticeable.

The 1:1 imaging system of the prototype is implemented by using a Canon 100 mm, f/2.8 macro lens. This results in a distance of about 300 mm between the lens and the filter plane. In addition, the distance between the pickup system and the filter plane has to be adjusted to this length to ensure 1:1 imaging, preserving the overall width and height of the imaging system to match that of a full-frame sensor, i.e. 36 mm×24 mm. Overall, this leads to an overall system length of about 1000 mm including the camera and the main lens for the prototype system.

The pre-processing procedure consists in registering the 3×3 subimages that are recorded by the sensor with one another. Since the images are located in the entrance plane and are coincident, a single geometric calibration procedure suffices for all applications presented below. The sub-images suffer from misregistration on the sensor primarily for two reasons: an imperfect arrangement of the mirror planes due to manual construction and geometric/chromatic aberrations induced by the prototypical optical setup.

These imperfections are addressed in two steps. While keeping the diffuser in place and removing the main lens, a transparency slide with a checkerboard pattern is used, that is placed in close distance to the diffuser. The slide is then illuminated with a far-away point light source, hereby projecting the pattern onto the diffuser. Taking distortions introduced by misalignments of the mirrors. The corner images of the 3×3 matrix of views encounter two levels of reflection. These images show a noticeable disagreement along their diagonals. Thus, each half of these images is compensated separately.

This first compensation is performed by estimating homographies between the outer and the central views and aligning all images to the central view.

Residual registration imperfections are caused by geometrical and chromatic aberrations that are addressed with a wavelet noise pattern [Cook and DeRose 2005], using a transparency slide as for the checkerboard. The distortions are estimated via an optical flow [Horn and Schunck 1981] with a strong smoothness prior.

To register the outer views to the central image, the composite of all displacements, i.e. homography-based warping and residual optical flow compensation is used. In the filter-based system, this process matches the images. In the light-field imaging case, the views are brought into agreement, as expected by the geometrical construction; horizontally-neighboring views show only horizontal and vertically-neighboring views only vertical parallax, diagonally displaced views show combinations thereof.

The system also shows radiometric distortions, i.e. vignetting is observable throughout the geometrically-registered images. To measure the effect, the main lens is reintroduced into the system and a strong diffuser added, which is illuminated from a far away diffuse light source. The resulting image is used to divide out vignetting effects caused by the optical system.

As a result of these pre-processing steps, a stack of images $I_i$ is obtained that are optically pre-filtered, as if taken in a time-sequential manner:

$$s^j = \int_{\omega, \lambda,} l_\chi^j(\chi, y, \omega, \lambda, t) f_i(\omega, \lambda) d\omega d\lambda dt, j=0 \ldots 3,$$

$$I_i = \{[1000] \cdot M_i \cdot [s^0, s^1, s^2, s^3]^T\}_0^1. \quad (2)$$

The formulation includes polarization parameters. The plenoptic function $l_\lambda$ consists of four parts; the four Stokes parameters $s^j$ with the following definitions:

$$l_\lambda^1 = E_X E_X^* + E_Y E_Y^*, \; l_\lambda^2 = E_X E_X^* - E_Y E_Y^*, \; l_\lambda^3 = E_X E_Y^* + E_Y E_X^*, \; l_\lambda^4 = i(E_X E_Y^* - E_Y E_X^*),$$

where $E_X$ and $E_Y$ are the two orthogonal plane wave components of the electric field E and * signifies complex conjugation. The optical filters are denoted by sets $\{M_i, f_i\}$, consisting of a standard optical filter $f_i$ and a Mueller matrix $M_i$. For the plenoptic dimensions, wavelength is denoted as $\lambda$, directions as $\omega$, and time as t. Multiplication by the [1000] vector extracts the irradiance measurement that is being registered by the sensor. The clamping operation $\{\cdot\}_0^1$ models the saturation limit imposed by a real sensor. Not all of the filter dimensions (wavelength, polarization, and direction) are used simultaneously in the following. Rather, each of the described application areas uses one dimension at a time.

FIG. 8 shows tone-mapped results of three example scenes captured with the high dynamic range setup.

For HDR imaging, the filter array consists of 3×3 neutral density filters and the optical filters in Eq. 2 become $\{1, c_i\}$, i=1 . . . 9 with a unit Mueller matrix and constant spectral filters $f_i(\lambda)=c_i$. A set with transmittance values of $\{1.0, 0.5, 0.25, 0.126, 0.063, 0.032, 0.016, 0.008, 0.004\}$ is chosen, yielding a dynamic range improvement of about 8 f-stops over that of the sensor dynamic range. These images have a verified linear response and can be merged by standard mechanisms [Debevec and Malik 1997]. For video operation, the camera applies an adaptive response curve. The radiometric response is estimated by a variant of Mitsunaga and Nayars [1999] polynomial technique that estimates the response from a series of photographs of a MacBeth color checker while enforcing curvature constraints on the final curve [Ihrke 2012].

For multispectral imaging, the system is equipped with 3×3 broadband spectral filters as manufactured by Rosco Labs (Roscolux swatchbook). The filters in equation 2 become $\{1, c_i\}$, i=1 . . . 9.

Broadband spectral filters are used because the imaging system features a color filter array. Imaging 9 spectral filters through three different Bayer filters each results in an overall measurement of 27 broadband filtered images. Using narrow band filters would only yield 9 different measurements since the Bayer filters are largely orthogonal. The filters in the array are {Cyan #4360, Yellow #4590, Red #26, Orange #23, Green #89, Blue-Green #93, Lavender #4960, Blue #80, Magenta #4760}. Their spectral response was measured using a spectrometer (Thorlabs CCS 200).

For spectral calibration of the Bayer filters, a scene containing a MacBeth color checker is illuminated with a high pressure mercury vapor lamp with a previously acquired spectrum $s_{mv}$. In the multispectral imaging case, Eq. 2 can be simplified to $$I_i^{r/g/b}(\chi, y) = \int_\lambda l_\lambda(\chi, y, \lambda), f^{r/g/b}(\lambda) f_i(\lambda) s(\lambda) d\lambda, \quad (3)$$

where $f^{r/g/b}(\lambda)$ denotes the spectral sensitivity of the camera for the R, G, and B channels, $f_i(\lambda)$ are the known spectra of the Roscolux filters, and s is the spectrum of the light source. In this case, the plenoptic function $l_\lambda(\chi, y, \lambda)$ only depends on the spectral scene reflectance whose spectrum $l_\lambda(\chi, y, \lambda)$ is known through collected measurements obtained from http://www.babelcolor.com/main_level/ColorChecker.htm. The spectrum of the light source is $s_{mv}$. Therefore, all components of the integral in Eq. 3 except for the Bayer filter responses $f^{r/g/b}(\lambda)$ are known and can be estimated by an expansion into basis functions similar to Toyooka and Hayasaka [Toyooka and Hayasaka 1997]. A set of 50 overlapping Gaussians distributed in the range between 400 and 700 nm is chosen as basis. The optimization problem uses images through all 116 Roscolux filters and enforces a non-negativity constraint via quadratic programming.

Once the spectral response of the sensor is known, arbitrary scenes can be imaged. If the spectrum of the light source $s(\lambda)$ is known, a neutral reflectance spectrum can be recovered, otherwise, only the product $l_\lambda(\chi, y, \lambda)s(\lambda)$ is accessible. The scene spectra are recovered similar to spectral calibration of the sensor, except that now the spectral sensitivities $f^{r|g|b}(\lambda)$ of the sensor are known whereas the scene spectrum $l_\lambda(\chi, y, \lambda)$ or its product with the illumination spectrum $l_{80}(\chi, y, \lambda)s(\lambda)$ are estimated. In this case, spectral white balancing, similar to RGB white balancing can be performed by dividing all spectra by the spectrum of a known white scene patch.

Figure 9:
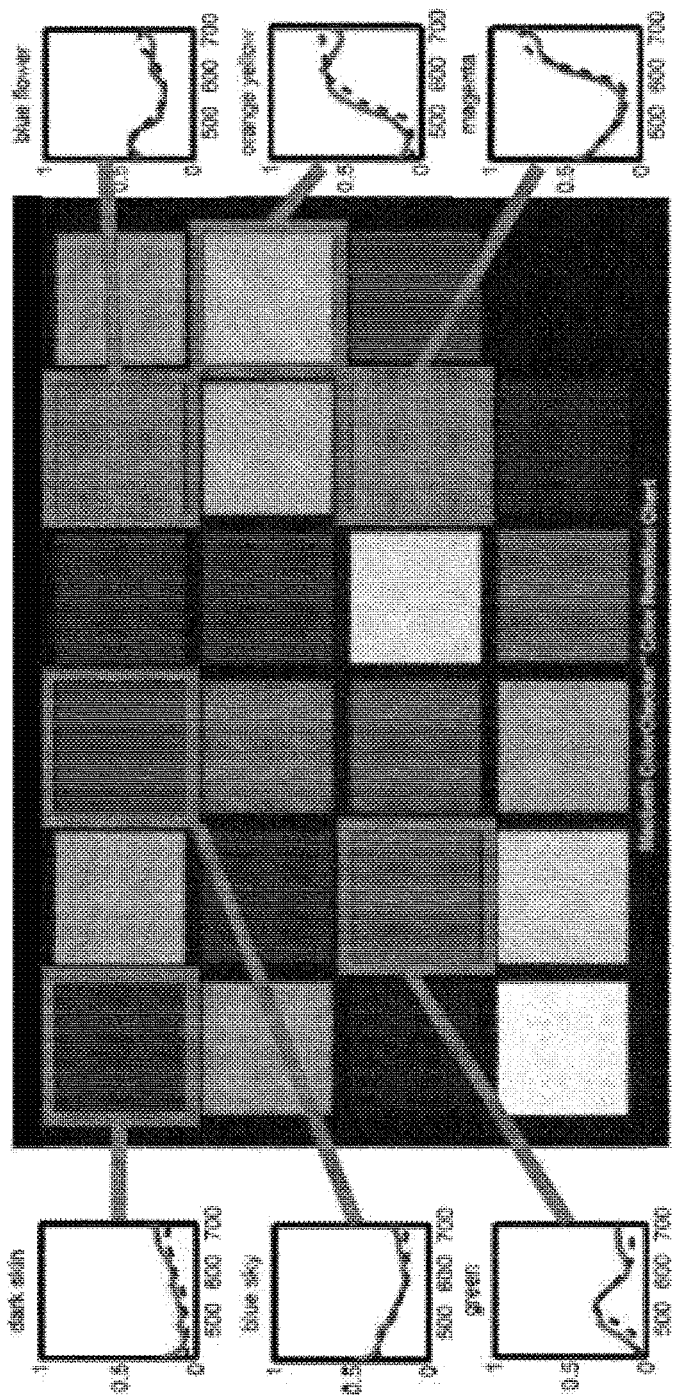
FIG. 9 shows a ground truth evaluation of a multispectral imaging pipeline according to an embodiment of the invention.

In contrast to the spectral calibration step, image spectra have to be estimated for every pixel and quadratic programming becomes too costly. Instead, the non-negativity constraint may be dropped and a least squares problem solved per-pixel and negative values clamped to zero. For improved regularization, a PCA basis as in [Toyooka and Hayasaka 1997] is used. The performance of the prototypical multi-spectral imaging pipeline was verified by imaging a Gretag Macbeth color checker under known illumination. The reconstructed spectral reflectance agrees well with collected data (babelcolor), see FIG. 9.

Figure 10:
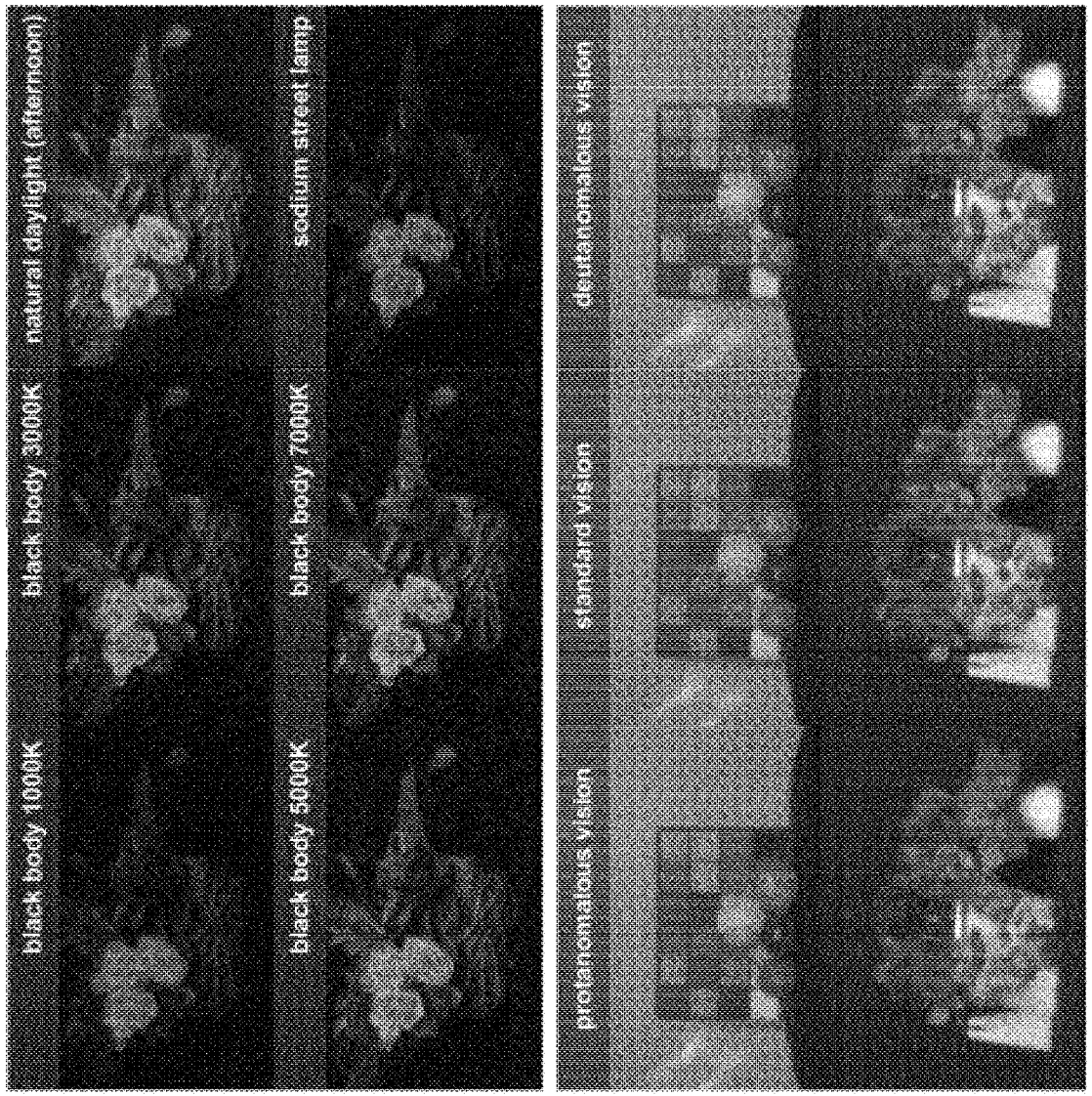
FIG. 10 shows exemplary of multispectral images using the prototype implementation.

FIG. 10 shows examples multispectral-imaging applications using the described prototype. Spectral relighting with ideal Planckian black body light sources of different temperature, and relighting with natural day light and a high-pressure sodium street light (top row). The street light leads to the familiar green loss. The scene is metameric for low color temperatures, but under daylight illumination the plastic and the two real flowers are clearly distinguishable. Simulation of color-deficient vision for a color checker and a natural scene (bottom rows). Protanomalous vision shifts the response of the red sensitive cones towards green by ≈10 nm, whereas deutanomalous vision shifts the green cone response by ≈10 nm towards the red.

Figure 11:
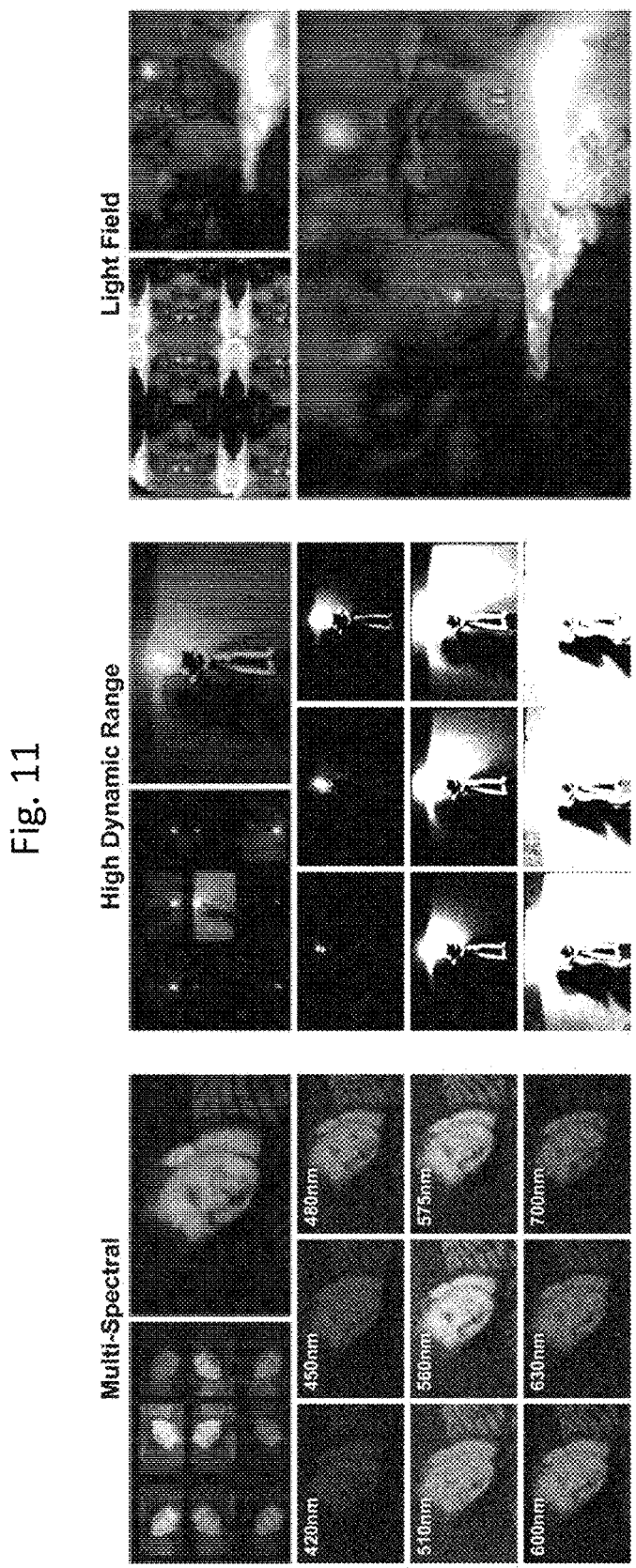
FIG. 11 shows exemplary applications of the camera add-on prototype.

FIG. 11 shows exemplary applications of the camera add-on prototype. The top row shows multispectral imaging: unprocessed output (left), a spectral stack of images after processing (middle), a neutral image relit with a flat spectrum (right). The middle row shows examples of high dynamic range (HDR) imaging: unprocessed output (left), a simulated exposure sweep of contrast ratio 100:1 (middle), a tone-mapped version of the HDR image (right). The bottom row shows examples of light-field imaging: unprocessed output (left), virtual refocusing on foreground (middle) and background (right).

Figure 12:
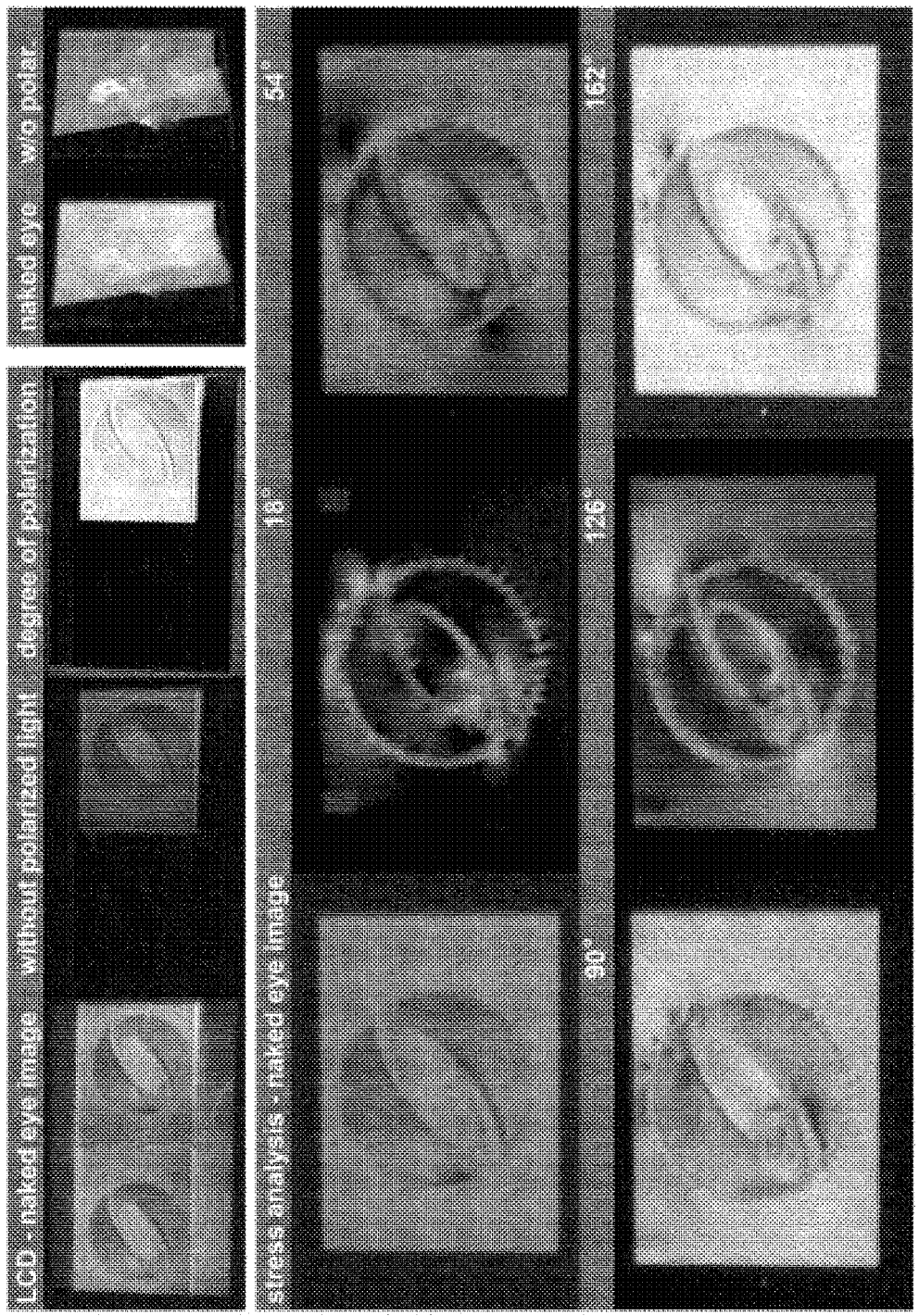
FIG. 12 shows examples of polarization imaging using the prototype implementation.

FIG. 12 shows examples of polarization imaging using the prototype implementation of the invention. In the top row, the logo on the left is shown on the screen, whereas the logo on the right is equipped with polarization filters printed on paper. The paper acts as a diffuser and destroys the LCD's light polarization. What is shown is the image perceived by the eye (left), a linear polarizer simulation that removes the LCD's light (middle) and the degree of polarization (right, white indicates an unpolarized state). The doll example illustrates reflection removal by a virtual polarization filter. Polarization stress analysis (bottom rows): a transparent acrylic glass window is attached to an LCD screen acting as a source for polarized light. The window contains drilled holes in form of the logo's outline that induce stress in the material. The images show different simulations from the system output, making stress patterns appear in the form of color fringes. The upper left image shows the logo displayed on the LCD screen as it would be perceived by an unaided human eye.

Hereby, the camera is made sensitive to the polarization state of light and acts as a pixel-by-pixel polarization state analyzer. To this end, at least three independent measurements have to be carried out and four if the full polarization state that also includes the circular polarization component is to be retrieved [Goldstein 2003].

The scope of the prototype was restricted to linear polarization imaging, since, apart from some special cases of, e.g., circular dichroism and circularly-polarized luminescence, significant levels of circular polarization are rarely encountered in nature [Hegedus et al. 2006].

For this purpose, five linear sheet polarizers with differently orientated transmission axes ≈{0°, 36°, 72°, 108°, 144°} were placed into the filter array of the system. In terms of Eq. 2, the filters become $\{M_i, 1\}$, i=1 . . . 5, where 1 denotes an optical filter $f_i=1$. The four corners of the array were left empty and the corresponding sub-images were ignored. The setup still provides more measurements per pixel than needed. Those images produced by second-order reflections are avoided, which are more prone to optical aberrations and complex polarization modulation.

When only linear polarization is measured, the first three Stokes components $s^j$, j=0 . . . 2 can be retrieved and the fourth circular component $s^3$, if any, is considered as part of the unpolarized component $s^0$ of the light. Correspondingly, 3×3 Mueller matrices are employed, which is a common procedure in linear polarimetry [Neumann et al. 2008]. To determine the Stokes vectors, the 3×5 matrix W is constructed whose consecutive rows are identical to the upper row of the respective Mueller matrices $M_i$, i=0 . . . 4.

For each pixel, the measured intensities through the five polarization filters are stored in a vector p, the Stokes vector $s=(s^0, s^1, s^2)$ is obtained by least-squares regression $$s=(W^T W)^{-1} W^T p. \quad (4)$$

Some additional care is needed because the filter array is placed inside the optical system, whose reflections and scattering affect the polarization state of light. The total influence of the system including that of the polarization filters can be characterized by an effective Mueller matrix $M_{sys}(\chi, y)$, which is spatially dependent. The most prominent effect is caused by the mirrors of the image multiplier. This pixel-wise Mueller matrix is determined by a calibration procedure that uses a ground truth polarimeter to obtain the Stokes vectors of 6 scenes with homogenous (i.e. spatially non-dependent) polarization states and relating these values to the ones observed by the system. The linear relation $s_{sys}^{(i)}(\chi, y)=M_{sys}(\chi, y)s_{gt}^i$, i=1 . . . 6 is then solved in a least-squares sense for $M_{sys}$. Here, $s_{sys}^{(i)}$ are the Stokes parameters measured by the system, whereas s(i) gt are the Stokes parameters measured by the ground truth polarimeter. In practice, 30 differently polarizer/analyzer pair images are used to perform the polarization calibration.

The low angular resolution of the 3×3 light fields necessitates an angular up-sampling scheme in order to perform convincing refocusing and view-point changes at a reasonable distance outside the focal plane of the system. In practice, the observed parallax in the system can exceed 100 pixels. The spatial resolution of the images returned by the system is, however, large with a resolution of approx. 1800×1200 pixels for each sub-view. The angular interpolation problem may be addressed by first performing a depth estimate, and a parallax-based morphing operation. This morphing also makes view extrapolation possible, which enables an aperture synthesis beyond the limits of the main lens.

Optical flow techniques and the adaptation of Horn-Schunck [Horn and Schunck 1981] are applied to estimate depth.

Modifications consist in introducing a coupling between the flow variables of different views. It is well known that optical flow suffers from the so-called aperture problem, i.e. two variables are sought at every image location, but only a single constraint is available. In the case of light-field imaging, the flow is known to be constrained to the directions of the epipolar lines between views.

Moreover, the structure of these epipolar lines is very regular due to the fixed spacing between the virtual views. The optical-flow vectors are therefore replaced by depth estimates $d(\chi, y)$ that couple the flow estimates in all surrounding light field views via the depth-induced parallax $d(\chi, y) \cdot [u_i, v_i]$, where the vector $[u_i, v_i]$ is a constant for every view $I_i$ and describes the slope of the epipolar lines. Due to the constraints of the prototyped setup, one can safely assume the epipolar lines to be parallel in every sub-view.

This depth estimation is based on the optical flow brightness constancy assumption and, therefore, does not estimate the real scene depth. However, it computes an estimate of apparent depth. Since one is not interested in depth per se, but in its view interpolating properties, this approach is reasonable for angular light-field upsampling.

The view interpolation and extrapolation, a depth map is estimated for each of the sub-views, which allows to generate a new view by morphing the sub-views $I_i$ according to the parallax displacement $d \cdot [u_i, v_i]^T$. The main challenges for a high-quality interpolation are a proper handling of the occlusion boundaries, the handling of multiple pixels of an input view mapping to the same destination pixel, and the avoidance of interpolation holes by forward warping. The proposed morphing uses forward and backward warping steps followed by a blending procedure.

Each of the nine sub-views may contain exclusive information not available in any other subview but valuable for the interpolated view. However, warping all views can lead to blur because the depth estimation is only approximate. Using the four neighboring views of the interpolated position on the main lens aperture is a good tradeoff. A similar scheme can be used for extrapolation; using the two (for extrapolation in u or v) or the one closest view (for extrapolation in u and v).

Figure 13:
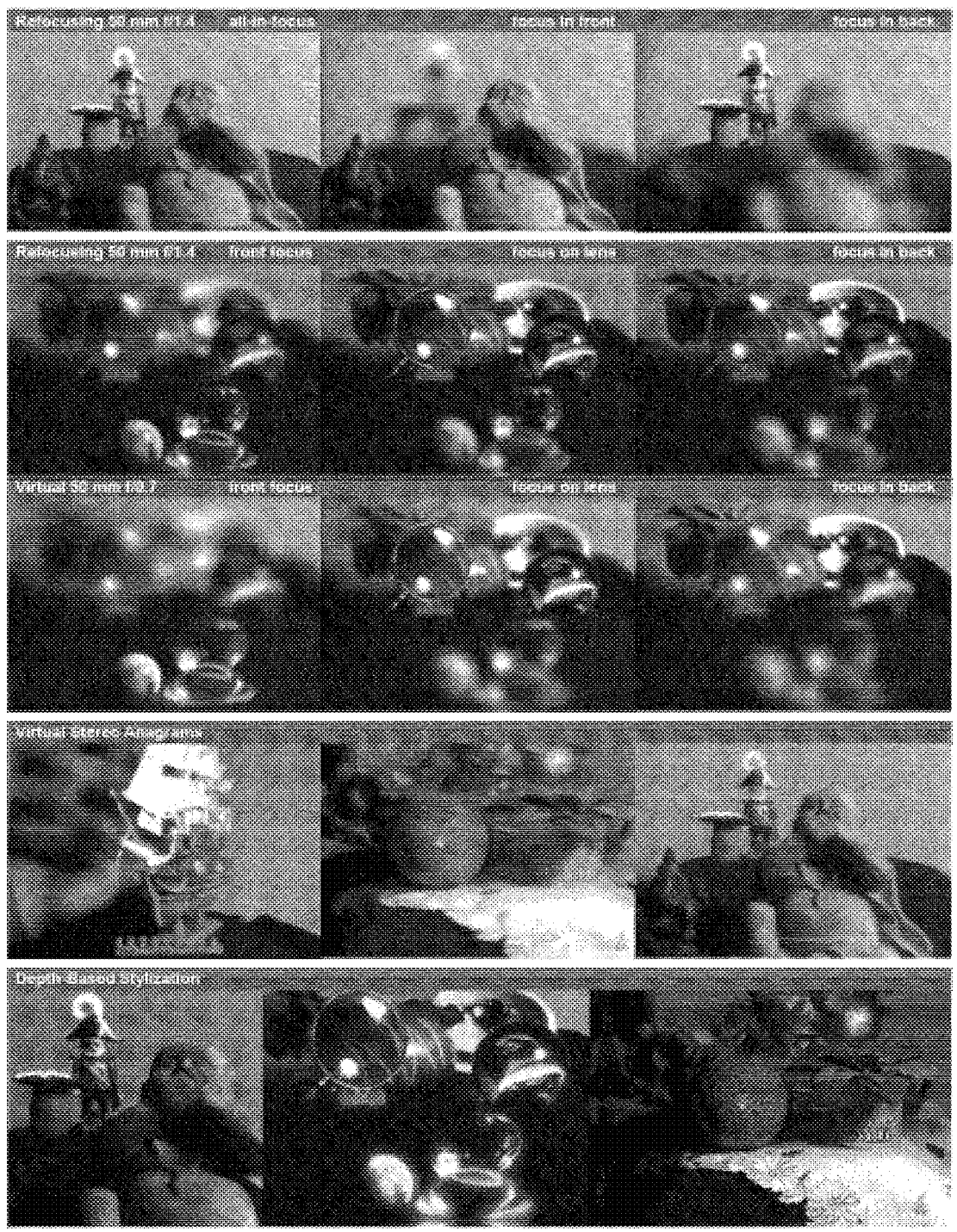
FIG. 13 shows examples of light-field imaging applications.

FIG. 13 shows examples of light-field imaging applications. The topmost row shows strong refocusing with a virtual aperture matching the real Canon EF 50 mm f/1.4 USM lens, which was used to record the scene. The all-in-focus view is an example of an interpolated light-field view. The second and third rows show refocusing in a challenging setting comprising specular, mirroring and refracting objects. The second row shows refocusing within the physical limits of the real aperture, the third uses extrapolation to virtually extend the aperture by one full size to each side, leading to a virtual f/0.7. This mode enables macro-photography effects for standard lenses and wide fields of view. When comparing the quality of the in-focus regions; no significant loss in sharpness is observed for the extended aperture case, validating the suitability of the depth-estimation and view-morphing procedures according to the invention. The fourth row shows virtual stereo images in the form of anaglyphs with an adaptable base line of three light-field scenes. The fifth row shows depth-based stylization examples: from left to right, painterly/real style, bloom+contrast+coloring/real, and sharpening/blur.

The figure shows that the inventive extrapolation solution allow to virtually extend the aperture of the main lens to generate increased parallax and extremely shallow depth-of field effects.

The size of the overall system is determined by the distance between the sensor and the first imaging element of the optical design. In SLR type cameras, this distance is bounded from below by the moving mirror of these cameras and can be assumed to be around 50 mm for a full-frame sensor. In the filter-based design, this requirement determines the focal length f of the 1:1 imaging system and with it the overall length of the optical system as $(6+2N) \cdot f$ if $N \times N$ copies are to be imaged.

The focal length f is therefore fixed to ≈25 mm. With N=3 (9 sub-images), a length of ≈300 mm is needed. The diameters of the 1:1 imaging lens and the pickup lens determine the maximum pickup aperture and are therefore uncritical. The pupil matching lenses in the filter plane and in the entrance plane, however, have to cover the full sensor size. Fortunately, these lenses have focal lengths of ≈50 mm each, given the previous considerations of a full-frame sensor and a 50 mm distance between the sensor and the optical system. All required lenses would therefore be available as stock parts with a reasonable optical performance.

For the light field design, the 1:1 imaging and the filter plane optics can be omitted. The minimum distance of the system is now determined by the closest position that the pickup lens can assume.

Given these considerations, z in Eq. 1 equals 50 mm and the overall system length is 4·z=200 mm for 3×3 copies.

Overall, the system is suitable for imaging a low number of copies with its size increasing linearly for a larger number. The system size also scales linearly with the sensor size of the camera being employed. Smaller units could thus be designed for smaller sensors.

It is also possible to remove the mirror in SLR cameras since an optical view finder is not strictly necessary for computational cameras, therefore miniaturizing the design even further.

REFERENCES

ADELSON, E. H., AND BERGEN, J. R. 1991.
The Plenoptic Function and the Elements of Early Vision. In *Computational Models of Visual Processing*, MIT Press, 3-20.
ADELSON, E., AND WANG, J. 1992.
Single Lens Stereo with a Plenoptic Camera. *IEEE Trans. PAMI* 14, 2, 99-106.
BAYER, B. E., 1976.
Color Imaging Array. U.S. Pat. No. 3,971,065.
BONNET, H., ABUTER, R., BAKER, A., ET AL. 2004.
First Light of SINFONI at the VLT. *ESO Messenger* 117, 17, 17-24.
CAO, X., TONG, X., DAI, Q., AND LIN, S. 2011.
High-Resolution Multi-Spectral Video Capture with a Hybrid Camera System. In *Proc. CVPR*, 297-304.
COOK, R. L., AND DEROSE, T. 2005.
Wavelet Noise. *ACM TOG* 24, 3, 735-744.
DEBEVEC, P. E., AND MALIK, J. 1997.
Recovering High Dynamic Range Radiance Maps from Photographs. In *Proc. SIGGRAPH*, 369-378.
DESCOUR, M., AND DERENIAK, E. 1995.
Computed-tomography Imaging Spectrometer: Experimental Calibration and Reconstruction Results. *Appl. Optics* 34, 22, 4817-4826.

DU, H., TONG, X., CAO, X., AND LIN, S. 2009.
A Prism-Based System for Multispectral Video Acquisition. In *Proc. ICCV,* 175-182.

GEHM, M. E., JOHN, R., BRADY, D. J., WILLETT, R. M., AND SCHULZ, T. J. 2007.
Single-Shot Compressive Spectral Imaging with a Dual-Disperser Architecture. *Optics Exp.* 15, 21, 14013-14027.

GOLDSTEIN, D. H. 2003.
*Polarized Light,* 2nd edition. CRC Press, New York, US.

GORTLER, S., GRZESZCZUK, R., SZELINSKI, R., AND COHEN, M. 1996.
The Lumigraph. In *Proc. SIGGRAPH,* 43-54.

HABEL, R., KUDENOV, M., AND WIMMER, M. 2012.
Practical Spectral Photography. *CGF* 31, 2 (May), 449-458.

HAN, J. Y., AND PERLIN, K. 2003.
Measuring Bidirectional Texture Reflectance with a Kaleidoscope. In *Proc. SIGGRAPH,* 741-748.

HEGEDUS, R., SZEL, G., AND HORVATH, G. 2006.
Imaging polarimetry of the circularly polarizing cuticle of scarab beetles (*Coleoptera: Rutelidae, Cetoniidae*). *Vision Research* 46, 2786-2797.

HORN, B. K. P., AND SCHUNCK, B. G. 1981.
Determining Optical Flow. *Artif. Intell.* 17, (1-3), 185-203.

HORSTMEYER, R., EULISS, G., ATHALE, R., AND LEVOY, M. 2009.
Flexible Multimodal Camera Using a Light Field Architecture. In *Proc. ICCP,* 1-8.

IHRKE, I., WETZSTEIN, G., AND HEIDRICH, W. 2010.
A Theory of Plenoptic Multiplexing. In *Proc. CVPR,* 1-8.

IHRKE, I., 2012.
Color Calibration Toolbox for MATLAB v2.0. http://giana.rnmci.uni-saarland.de/software.html.

ISAKSEN, A., MCMILLAN, L., AND GORTLER, S. J. 2000.
Dynamically Reparameterized Light Fields. In *Proc. SIGGRAPH,* 297-306.

IVES, H., 1903.
Parallax Stereogram and Process of Making Same. U.S. Patent No. 725,567.

KUDENOV, M., AND DERENIAK, E. 2011.
Compact Snapshot Real-Time Imaging Spectrometer. In *SPIE Conf. on Elec.-Opt. Rem. Sens., Phot. Tech., and Appl. V,* 81860W-1-81860W-12.

LANMAN, D., RASKAR, R., AGRAWAL, A., AND TAUBIN, G. 2008.
Shield Fields: Modeling and Capturing $_3$D Occluders. *ACM TOG* 27, 5, 131.

LEVOY, M., AND HANRAHAN, P. 1996.
Light Field Rendering. In *Proc. SIGGRAPH,* 31-42.

LEVOY, M., CHEN, B., VAISH, V., HOROWITZ, M., MCDOWALL, I., AND BOLAS, M. 2004.
Synthetic Aperture Confocal Imaging. *ACM TOG* 23, 3, 825-834.

LIPPMANN, G. 1908.
La Photographie Inte' grale. *Academie des Sciences* 146, 446-451.

LUMSDAINE, A., AND GEORGIEV, T. 2009.
The Focused Plenoptic Camera. In *Proc. ICCP,* 1-8.

MANN, S., AND PICARD, R. W. 1995.
Being 'Undigital' with Digital Cameras: Extending Dynamic Range by Combining Differently Exposed Pictures. In *Proc. IS&T,* 442-448.

MCGUIRE, M., MATUSIK, W., PFISTER, H., CHEN, B., HUGHES, J. F., AND NAYAR, S. K. 2007.
Optical Splitting Trees for High-Precision Monocular Imaging. *IEEE CG&A* 27, 2, 32-42.

MITSUNAGA, T., AND NAYAR, S. K. 1999.
Radiometric Self Calibration. In *Proc. CVPR,* 374-380.

NARASIMHAN, S., AND NAYAR, S. 2005.
Enhancing Resolution along Multiple Imaging Dimensions using Assorted Pixels. *IEEE Trans. PAMI* 27, 4, 518-530.

NAYAR, S., AND MITSUNAGA, T. 2000.
High Dynamic Range Imaging: Spatially Varying Pixel Exposures. In *Proc. CVPR,* vol. 1, 472-479.

NEUMANN, L., HEGEDUS, R., HORVATH, G., AND GARCIA, R. 2008.
Applications of High Precision Imaging Polarimetry. In *Proc. Computational Aesthetics in Graphics, Visualization and Imaging,* 89-97.

NG, R., LEVOY, M., BRE'DIF, M., DUVAL, G., HOROWITZ, M., AND HANRAHAN, P. 2005.
Light Field Photography with a Hand-Held Plenoptic Camera. Tech. Rep. Computer Science CSTR 2005-02, Stanford University.

NG, R. 2005.
Fourier Slice Photography. *ACM TOG* 24, 3, 735-744.

OKAMOTO, T., AND YAMAGUCHI, I. 1991.
Simultaneous Acquisition of Spectral Image Information. *Optics Lett.* 16, 16, 1277-1279.

PARK, J.-I., LEE, M.-H., GROSSBERG, M. D., AND NAYAR, S. K. 2007.
Multispectral Imaging Using Multiplexed Illumination. In *Proc. ICCV,* 1-8

PEZZANITI, J. L., CHENAULT, D., ROCHE, M., REINHARDT, J., PEZZANITI, J. P., AND SCHULTZ, H. 2008.
Four Camera Complete Stokes Imaging Polarimeter. In *Proc. SPIE 6972, Polarization: Measurement, Analysis, and Remote Sensing VIII,* 69720J-1-69720J-12.

REINHARD, E., WARD, G., DEBEVEC, P., PATTANAIK, S., HEIDRICH, W., AND MYSZKOWSKI, K. 2010.
*High Dynamic Range Imaging: Acquisition, Display and Image-Based Lighting.* Morgan Kaufmann Publishers.

RESHETOUSKI, I., MANAKOV, A., SEIDEL, H.-P., AND IHRKE, I. 2011.
Three-Dimensional Kaleidoscopic Imaging. In *Proc. CVPR,* 353-360.

RUMP, M., AND KLEIN, R. 2010.
Spectralization: Reconstructing spectra from sparse data. In *Proc. EGSR,* 1347-1354.

SCHECHNER, Y., AND NAYAR, S. 2005.
Generalized Mosaicing: Polarization Panorama. *IEEE Trans. PAMI* 27, 4, 631-636.

SCHECHNER, Y., NARASIMHAN, S. G., AND NAYAR, S. K. 2001.
Instant Dehazing of Images using Polarization. In *Proc. CVPR,* 325-332.

SPIERING, B. A., 1999.
Multispectral Imaging System. U.S. Pat. No. 5,900,942.

TOCCI, M. D., KISER, C., TOCCI, N., AND SEN, P. 2011.
A Versatile HDR Video Production System. *ACM TOG* 30, 4.

TOYOOKA, S., AND HAYASAKA, N. 1997.
Two-Dimensional Spectral Analysis using Broad-Band Filters. *Optical Communications* 137 (Apr), 22-26.

VEERARAGHAVAN, A., RASKAR, R., AGRAWAL, A., MOHAN, A., AND TUMBLIN, J. 2007.
Dappled Photography: Mask Enhanced Cameras For Heterodyned Light Fields and Coded Aperture Refocussing. *ACM TOG* 26, 3, 69.

WANNER, S., AND GOLDLUECKE, B. 2012.
Globally Consistent Depth Labeling of $_4$D Lightfields. In *Proc. CVPR,* 41-48.

WANNER, S., AND GOLDLUECKE, B. 2012.
Spatial and Angular Variational Super-Resolution of 4D Light Fields. In *Proc. ECCV*, 608-621.

WETZSTEIN, G., IHRKE, I., LANMAN, D., AND HEIDRICH, W. 2011.
Computational Plenoptic Imaging. *CGF* 30, 8, 2397-2426.

WILBURN, B., JOSHI, N., VAISH, V., ET AL. 2005.
High Performance Imaging using Large Camera Arrays. *ACM TOG* 24, 3, 765-776.

ZHOU, C., AND NAYAR, S. 2011.
Computational Cameras: Convergence of Optics and Processing. *IEEE Trans. IP* 20, 12 (Dec), 3322-3340.

The invention claimed is:

1. An imaging device, insertable between a lens and a body of a camera, the camera comprising an image sensor, the imaging device comprising:
   an image multiplier using reflection for obtaining a multitude of optical images of an object or scene;
   a pick-up system for imaging at least some of the multitude of optical images to the image sensor during the same exposure of the image sensor, wherein the pickup system has a stoppable aperture,
   characterized in that
   when the imaging device is inserted, the pick-up system is arranged between the image multiplier and the image sensor of the camera; and
   said stoppable aperture of said pickup system regulates a depth of field of individual optical images of said multitude of optical images.

2. The imaging device of claim 1, further comprising:
   an array of optical filters for filtering the multitude of optical images imaged by the pick-up system.

3. The imaging device of claim 2, further comprising an imaging system for imaging the filtered images onto the imaging sensor.

4. The imaging device of claim 1, further comprising a pupil-matching lens to adjust for external optical device properties.

5. The imaging device of claim 2, wherein the filters comprise neutral density, multispectral, polarization or temporal filters.

6. The imaging device of claim 1, further comprising a diffuser screen.

7. A photo and/or video camera, comprising an imaging device according to claim 1.

8. A camera add-on, comprising an imaging device according to claim 1.

9. A system, comprising an imaging device according to claim 1 and an objective lens.

10. A computer-implemented method, comprising the steps of:
    receiving at least some images or image sequences acquired using an imaging device according to claim 1;
    reconstructing a digital image or video, based on the at least some images or image sequences; and
    outputting the digital image or video.

11. An imaging device, insertable between a lens and a body of a camera, the camera comprising an image sensor, the imaging device comprising:
    a prism coated with a reflective material for obtaining a multitude of optical images of an object or scene;
    a pick-up system for imaging at least some of the multitude of optical images to the image sensor during the same exposure of the image sensor, wherein the pickup system has a stoppable aperture,
    characterized in that
    when the imaging device is inserted, the pick-up system is arranged between the image multiplier and the image sensor of the camera; and characterized in that
    said stoppable aperture of said pickup system regulates a depth of field of individual optical images of said multitude of optical images.

12. The imaging device of claim 11, further comprising:
    an array of optical filters for filtering the multitude of optical images imaged by the pick-up system.

13. The imaging device of claim 12, further comprising an imaging system for imaging the filtered images onto the image sensor.

14. The imaging device of claim 12, wherein the filters comprise neutral density, multispectral, polarization or temporal filters.

15. The imaging device of claim 11, further comprising a pupil-matching system to adjust for external optical device properties.

16. The imaging device of claim 11, further comprising a diffuser screen.

17. A photo and/or video camera, comprising an imaging device according to claim 11.

18. A camera add-on, comprising an imaging device according to claim 11.

19. A system, comprising an imaging device according to claim 11 and an objective lens.

* * * * *